United States Patent
Takaoku et al.

(10) Patent No.: US 7,666,370 B2
(45) Date of Patent: Feb. 23, 2010

(54) SODIUM SALT RECYCLING PROCESS FOR USE IN WET REPROCESSING PROCESS OF SPENT NUCLEAR FUEL

(75) Inventors: Yoshinobu Takaoku, Aomori (JP); Yukio Sumida, Aomori (JP); Noriyasu Moriya, Aomori (JP)

(73) Assignee: Japan Nuclear Fuel Limited, Aomori (JP)

( * ) Notice: Subject to any disclaimer, the term of this patent is extended or adjusted under 35 U.S.C. 154(b) by 0 days.

(21) Appl. No.: 12/087,288

(22) PCT Filed: Jan. 15, 2007

(86) PCT No.: PCT/JP2007/050395

§ 371 (c)(1),
(2), (4) Date: Jun. 30, 2008

(87) PCT Pub. No.: WO2007/083588

PCT Pub. Date: Jul. 26, 2007

(65) Prior Publication Data

US 2009/0068075 A1    Mar. 12, 2009

(30) Foreign Application Priority Data

Jan. 19, 2006   (JP) ............................. 2006-010676

(51) Int. Cl.
*B01D 11/00*   (2006.01)
*G21F 9/00*    (2006.01)
*G21F 9/16*    (2006.01)
*G21F 9/20*    (2006.01)

(52) U.S. Cl. .................. 423/8; 588/3; 588/11; 588/20; 588/252; 588/257; 210/638; 210/712; 210/757

(58) Field of Classification Search ............... 423/8–10; 210/638, 691, 712, 713, 757; 588/1, 2, 3, 588/10, 11, 20, 252, 257
See application file for complete search history.

(56) References Cited

U.S. PATENT DOCUMENTS

| | | | | |
|---|---|---|---|---|
| 4,056,482 A | * | 11/1977 | Schmieder et al. | .......... 205/688 |
| 4,059,671 A | * | 11/1977 | Schmieder et al. | ............ 423/10 |
| 4,358,426 A | * | 11/1982 | Tallent et al. | ................. 423/10 |

FOREIGN PATENT DOCUMENTS

JP    1-316695    12/1989

(Continued)

OTHER PUBLICATIONS

International Search Report issued Feb. 20, 2007 in the International (PCT) Application of which the present application is the U.S. National Stage.

(Continued)

*Primary Examiner*—Jerry Lorengo
*Assistant Examiner*—Carlos Barcena
(74) *Attorney, Agent, or Firm*—Wenderoth, Lind & Ponack, L.L.P.

(57) ABSTRACT

The present disclosure relates to a process for recycling a sodium salt by decomposition of a sodium nitride liquid waste, comprising a neutralization step in which a nitric acid liquid waste or an off-gas having nitric acid dissolved therein which is produced through a wet reprocessing process comprising a dissolution step for dissolving a spent nuclear fuel in nitric acid is neutralized by adding or contacting the nitrate liquid waste or the off-gas to or with at least one sodium salt selected from the group consisting of sodium hydroxide, sodium hydrogencarbonate and sodium carbonate, thereby yielding a sodium nitrate liquid waste; a sodium nitrate-decomposition step in which the sodium nitrate liquid waste is reductively decomposed with a reducing agent, thereby decomposing sodium nitrate into a nitrogen gas and the sodium salt; and a recycle step for recycling the sodium salt into the neutralization step or wet reprocessing process.

10 Claims, 1 Drawing Sheet

FOREIGN PATENT DOCUMENTS

| | | |
|---|---|---|
| JP | 6-258494 | 9/1994 |
| JP | 2003-126872 | 5/2003 |
| JP | 2004-101270 | 4/2004 |
| JP | 2004-354313 | 12/2004 |
| JP | 2005-241531 | 9/2005 |
| JP | 2005-329304 | 12/2005 |

OTHER PUBLICATIONS

Sakae Shikakura et al. "*Development on FBR Fuel Reporcessing Technology*", Japan Society of Mechanical Engineers, No. 96-3, 5$^{th}$ Power and Energy Technology Symposium 1996, Collected Papers for Lectures, pp. 351-354.

Tomozo Koyama et al. "*Component Technologies Development Reprocessing System—Advanced Aqueous Reprocessing Process Technologies*", Report from Japan Nuclear Cycle Development Institute, No. 24 Separate Volume, pp. 153-164 (Nov. 2004).

RITE-Wakamatsu Second Laboratory, "*Development of Wet Reductive Decomposition Processing Technique for Nitrate-Nitrogen in Wastewater*", Report on Completion of Program for Promotion of Technology Development from 2002 to 2004, I-26, Research Institute of Innovative Technology for the Earth, Mar. 2005 and its English abstract.

\* cited by examiner

SODIUM SALT RECYCLING PROCESS FOR USE IN WET REPROCESSING PROCESS OF SPENT NUCLEAR FUEL

TECHNICAL FIELD

The present invention relates to a technique for substantially decreasing generation of a sodium nitrate liquid waste, that is a secondary waste, by reductively decomposing a sodium nitrate liquid waste produced as a secondary waste through a wet reprocessing process of a spent nuclear fuel and recycling the obtained sodium salt(s) selected from sodium hydroxide, sodium hydrogencarbonate, and sodium carbonate.

BACKGROUND ART

Purex process that has been conventionally used as a reprocessing technique for a light-water reactor fuel is known as a wet reprocessing process of spent nuclear fuels.

In this process, after shearing a spent nuclear fuel, small pieces of the fuel are dissolved in nitric acid [dissolution step]. The nitric acid solution includes uranium, plutonium and FP (fission products), and insoluble residues of FP and solid impurities such as cladding tube chips produced during shearing. Thus, these residues and impurities are removed, and the nitric acid concentration and the like are adjusted [clarification and adjustment step]. This nitric acid solution is brought into contact with a mixed organic solvent of n-dodecane and TBP (tributyl phosphate) to extract uranium and plutonium into the organic solvent phase [extraction step], and to subject FP left in the nitric acid aqueous phase to vitrification as a high level liquid waste. The organic solvent phase containing uranium and plutonium is brought into contact with a nitric acid aqueous phase containing uranium (IV) or HAN (hydroxylamine nitrate) to back extract plutonium into the nitric acid aqueous phase and leave uranium in the organic solvent phase [distribution step]. The organic solvent phase containing uranium is further brought into contact with a diluted nitric acid solution to back extract uranium into the nitric acid aqueous phase. The obtained nitric acid solution containing uranium and the obtained nitric acid solution containing plutonium are subjected respectively to extraction, washing, back extraction, and condensation to remove impurities such as FP [purification step]. The purified nitric acid solution containing uranium and the purified nitric acid solution containing plutonium are also denitrated to recover a uranium oxide and a plutonium oxide respectively [denitration step].

In addition, development of reprocessing techniques represented by RETF (Recycle Equipment Test Facility), advanced wet reprocessing processes, and advanced wet reprocessing processes adopting direct extraction have been proposed as improved Purex processes (Non-Patent Documents 1 and 2).

The development of reprocessing techniques for fast reactor fuels in RETF has started on the basis of Purex process which has been put to practical use as a reprocessing technique of a spent nuclear fuel from a light-water reactor. Since the performance of each step of dissolution, clarification, and extraction needs to be improved in response to increasing FP contents due to increased fast reactor fuel burnup, the equipments such as continuous dissolvers, centrifugal clarifiers, and centrifugal extractors have been newly developed. However, separation of uranium and plutonium from a nitric acid solution of a spent nuclear fuel is carried out in accordance with Purex process.

In the advanced wet reprocessing process, some of a large amount of uranium included in a nitric acid solution of a spent nuclear fuel is separated and recovered in advance by an uranium crystallization method in which the temperature dependence of the uranium solubility is used to precipitate and separate uranium, thereby reducing the amount of nuclear materials to be treated in a subsequent solvent extraction step and the following steps. In order to use as a MOX (mixed oxide) fuel, an uranium oxide and a plutonium oxide that are recovered in conventional Purex process, have been mixed at an appropriate ratio. However, the uranium/plutonium ratio in a nitric acid solution of a spent nuclear fuel to be subjected to Purex process is controlled in advance to an appropriate ratio suitable for a MOX fuel, and uranium and plutonium are extracted into an organic solvent and then back extracted all together from the organic solvent, thereby allowing only an uranium/plutonium mixed oxide of the appropriate ratio to be obtained. Such a process has been proposed in the advanced wet reprocessing process.

The advanced wet reprocessing processes adopting direct extraction has been proposed as one of alternative techniques to the advanced wet reprocessing process, where a solvent in which nitric acid and TBP form a complex (TBP nitric acid complex) is directly brought into contact with a solid spent nuclear fuel, thereby selectively recovering uranium and plutonium. This process can be simplified as compared with the advanced wet reprocessing process, and reduces nitric acid for dissolution and the amount of liquid waste generated from an extraction step, and thus the reduction of the step for concentrating a high level liquid waste can be thus expected.

The above-described wet reprocessing processes include a dissolution step for dissolving a spent nuclear fuel in nitric acid, and nitric acid in washing liquids produced in separation or distribution of and a purification process of uranium or plutonium is mostly recovered by a nitric acid recovery system such as concentration by evaporation and reused, while some of the nitric acid results in excess nitric acid. This excess nitric acid is neutralized with a sodium salt selected from sodium hydroxide, sodium hydrogencarbonate and sodium carbonate, thereby producing a sodium nitrate liquid waste. It is to be noted that the term "sodium salt" as used herein refers to sodium hydroxide, sodium hydrogencarbonate or sodium carbonate.

It is often the case that liquid wastes produced in the analyses carried out in each step of the wet reprocessing process are also nitrate forms although occurring in slight amounts, and if these liquid wastes are acidic wastes, the wastes are subjected to neutralization processing with a sodium salt, thereby producing a sodium nitrate liquid waste.

Further, an off-gas produced in dissolving the spent nuclear fuel in the nitric acid includes nitrogen oxides, a slight amount of radioactive components and the like. The off-gas is thus washed with an alkali solution of a sodium salt (alkali scrubbing) in order to remove the nitrogen oxides, the radioactive components and the like, thereby producing a sodium nitrate liquid waste as the washing liquid waste.

In addition to this, an organic solvent degraded due to radiation is washed with a sodium salt in order to remove the degraded component. The liquid waste of the sodium salt is neutralized with nitric acid to produce a sodium nitrate liquid waste.

These sodium nitrate liquid wastes produced as secondary wastes through the wet reprocessing process are subjected to the processing such as concentration by evaporation, and the condensate liquid is discharged. Since the concentrated liquid is a low-level radioactive waste, the radioactive waste is subjected to vitrification, cement solidification or bituminization, or kept liquid, powdered, or pelletized for intermediate storage.

On the other hand, various reduction methods have been conventionally proposed, which may be catalytic reduction methods in which nitrate-nitrogen in liquid waste water containing nitrate-nitrogen is reduced to nitrogen gas with a reducing agent and catalyst or supercritical reduction methods in which the nitrate-nitrogen is reduced to nitrogen gas with a reducing agent under supercritical conditions where water serves as a supercritical fluid.

Methods using hydrogen as the reducing agent and methods using a reducing agent other than hydrogen are known as the catalytic reduction methods. The methods using hydrogen as the reducing agent include, for example, a method in which nitrate-nitrogen is reduced to nitrogen with a zeolite catalyst in the presence of hydrogen (Non-Patent Document 3). The methods using a reducing agent other than hydrogen include, for example, a method in which a reducing agent such as hydrazine is added to waste water containing nitrate-nitrogen, and the waste water is brought into contact with a sponge copper catalyst to reduce the nitrate-nitrogen to nitrite-nitrogen, and then further brought into contact with a palladium catalyst with hydrazine or the like to reduce the nitrite-nitrogen to nitrogen gas (Patent Document 1).

The supercritical reduction methods include, for example, a method in which a nitrogen in a nitrate is reduced to nitrogen gas with a reducing agent such as an alcohol, ammonia, carbohydrate, formic acid, or oxalic acid under conditions where water serves as a supercritical fluid, that is, at a temperature and a pressure equal to or more than the critical point (374° C., 22 MPa) of water (Patent Document 2).

Non-Patent Document 1: "Development on FBR Fuel Reprocessing Technology", Japan Society of Mechanical Engineers (No. 96-3), $5^{th}$ Power and Energy Technology Symposium '96, Collected Papers for Lectures Non-Patent Document 2: "Component Technologies Development of Reprocessing System—Advanced Aqueous Reprocessing Process Technologies Development—", Report from Japan Nuclear Cycle Development Institute, No. 24 Separate Volume, 153-164, November 2004

Non-Patent Document 3: "Development of Wet Reductive Decomposition Processing Technique for Nitrate-Nitrogen in Wastewater", Report on Completion of Program for Promotion of Technology Development from 2002 to 2004, I-26, RITE-Wakamatsu Second Laboratory, Research Institute of Innovative Technology for the Earth, March 2005

Patent Document 1: Japanese Patent Laid-Open No. 2003-126872

Patent Document 2: Japanese Patent Laid-Open No. 2005-241531

As described above, the sodium nitrate liquid wastes produced as secondary wastes through the wet reprocessing process of a spent nuclear fuel are subjected to processing such as concentration by evaporation, and the condensate liquid is discharged. Since the concentrated liquid is a low-level radioactive waste, the radioactive waste is subjected to vitrification, cement solidification or bituminization for storage, or kept liquid, powdered, or pelletized for intermediate storage.

However, when a spent nuclear fuel is subjected to wet reprocessing, sodium nitrate liquid waste that are secondary waste are inevitably produced, and the amount of radioactive waste to be processed correspondingly increases. This issue becomes a big problem when a wet reprocessing process is carried out.

It is thus an object of the present invention to provide a novel and improved method that is capable of substantially reducing the amount of radioactive waste generated due to a sodium nitrate liquid waste by reductively decomposing a sodium nitrate liquid waste produced through a wet reprocessing process of a spent nuclear fuel and recovering and reusing a sodium salt as a decomposition product.

DISCLOSURE OF THE INVENTION

The inventors have found that generation of a secondary waste due to a sodium nitrate can be effectively reduced by applying a conventionally proposed catalytic reduction method or a supercritical reduction method to processing of a sodium nitrate liquid waste produced through a wet reprocessing process of a spent nuclear fuel or of a sodium nitrate liquid waste produced through washing of an organic solvent used in a wet reprocessing process to reductively decompose sodium nitrate, and completed the present invention.

More specifically, an embodiment of the present invention is a sodium salt recycling process for use in wet reprocessing process of a spent nuclear fuel, characterized by comprising: a neutralization step in which a nitric acid liquid waste or an off-gas having nitric acid dissolved therein which is produced through a wet reprocessing process including a dissolution step for dissolving a spent nuclear fuel in nitric acid is neutralized by adding or contacting one or more sodium salts selected from sodium hydroxide, sodium hydrogencarbonate and sodium carbonate to or with the nitric acid liquid waste or the off-gas, thereby yielding a sodium nitrate liquid waste; a sodium nitrate-decomposition step in which the sodium nitrate liquid waste obtained in the neutralization step is reductively decomposed with a reducing agent, thereby decomposing sodium nitrate into a nitrogen gas and the sodium salt(s); and a recycle step for recycling the sodium salt(s) produced in the sodium nitrate-decomposition step into the neutralization step or the wet reprocessing process.

If necessary, an evaporative concentration step in which the sodium nitrate liquid waste obtained in the neutralization step is concentrated by evaporation may be provided, and the concentrated sodium nitrate liquid waste obtained in the evaporative concentration step may be reductively decomposed in the sodium nitrate-decomposition step.

Another embodiment of the present invention is a sodium salt recycling process for use in wet reprocessing process of a spent nuclear fuel, characterized by comprising: an organic solvent washing step in which an organic solvent used in a wet reprocessing process of a spent nuclear fuel is washed with one or more sodium salts selected from sodium hydroxide, sodium hydrogencarbonate and sodium carbonate; a neutralization step in which a liquid waste of the sodium salt(s) produced in the organic solvent washing step is neutralized with nitric acid, thereby yielding a sodium nitrate liquid waste; a sodium nitrate-decomposition step in which the sodium nitrate liquid waste produced in the neutralization step is reductively decomposed with a reducing agent, thereby decomposing sodium nitrate into a nitrogen gas and the sodium salt(s); and a recycle step for recycling the sodium salt(s) produced in the sodium nitrate-decomposition step into the organic solvent washing step or the wet reprocessing process.

If necessary, an evaporative concentration step in which the sodium nitrate liquid waste obtained in the neutralization step is concentrated by evaporation may be provided, and the concentrated sodium nitrate liquid waste obtained in the evaporative concentration step may be reductively decomposed in the sodium nitrate-decomposition step.

The reductive decomposition in the sodium nitrate-decomposition step can preferably employ reductive decomposition that is carried out with both a reducing agent and a catalyst, or reductive decomposition that is carried out with a reducing agent under supercritical conditions where water serves as a supercritical fluid.

Further, it is preferable that a part of the sodium salt(s) to be recycled in the recycle step can be sent and mixed in a solidified substance of a radioactive waste for solidification or in a vitrified substance of a high-level radioactive waste for vitrification.

According to the present invention, the reductive decomposition of the sodium nitrate liquid waste produced as a secondary waste through a wet reprocessing process of a spent nuclear fuel allows nitrate ions in the liquid waste to be reduced into a nitrogen gas and released into the air, and allows sodium ions to be recovered and recycled in a reusable form as sodium hydroxide, sodium hydrogencarbonate, or sodium carbonate, thereby allowing the amount of waste generated due to the sodium nitrate liquid waste to be substantially decreased.

Further, the amount of liquid waste to be decomposed can be decreased by concentrating by evaporation the sodium nitrate liquid waste obtained in the neutralization step to give a concentrated sodium nitrate liquid waste, and then reductively decomposing the concentrated sodium nitrate liquid waste, thus allowing the capacity of processing equipment to be decreased and allowing the processing time to be decreased.

Furthermore, a part of the sodium salt recycled in the recycle step is brought and mixed in a solidified substance of a radioactive waste for solidification, thereby allowing accumulation of radioactivity in the recycled sodium salt(s) to be reduced. In particular, when some of the sodium salt(s) to be recycled is mixed in a vitrified waste, the sodium salt(s) can be used as $Na_2O$ in borosilicate glass components, thus allowing the corresponding amount of new sodium salt(s) to be used in the neutralization step and allowing the amount of waste generated due to the sodium nitrate liquid waste to be cleared.

BEST MODE FOR CARRYING OUT THE INVENTION

Figure 1:
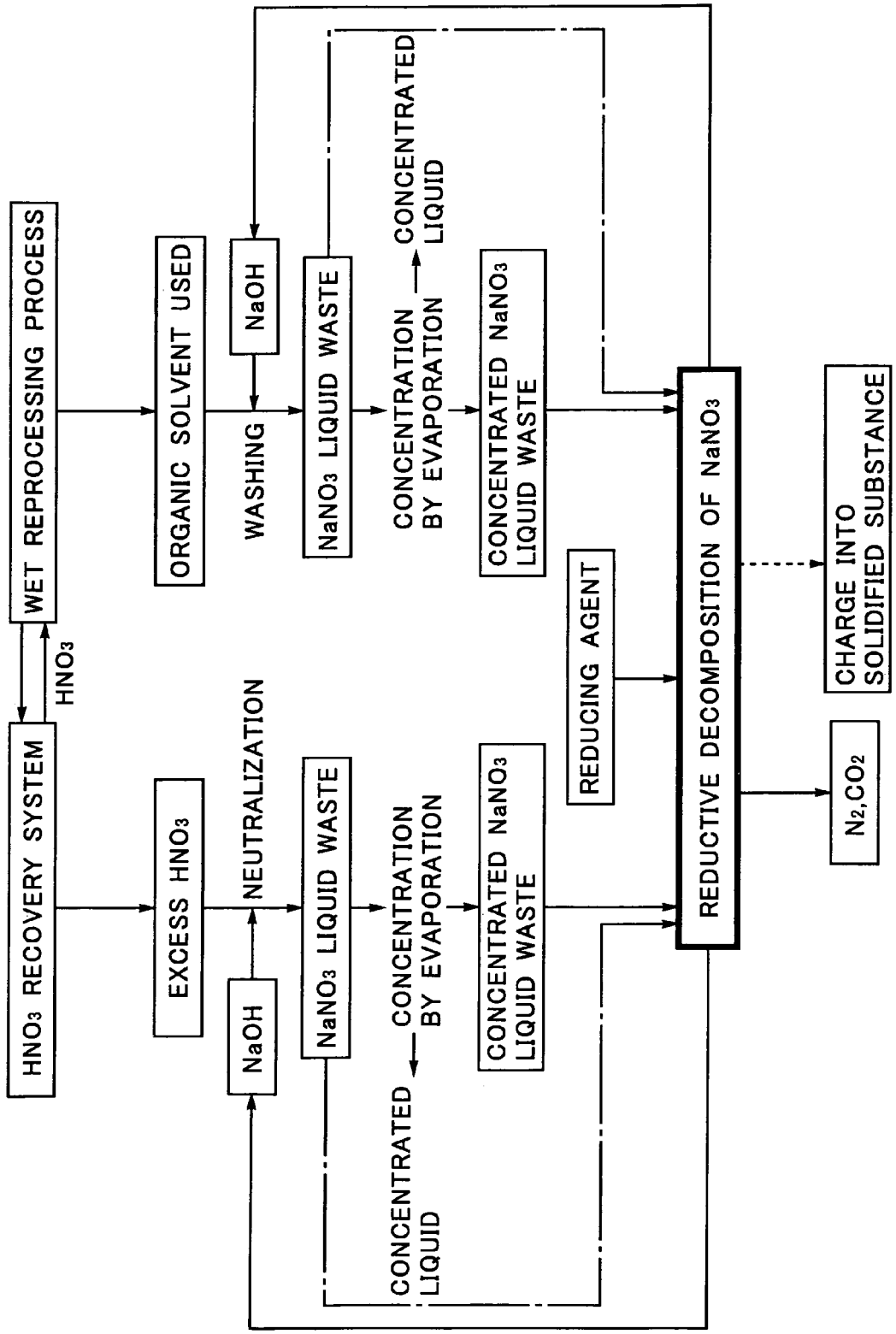
FIG. 1 is a process chart illustrating an example according to an embodiment of the present invention.

FIG. 1 is a process chart illustrating an example according to an embodiment of the present invention. It is to be noted that although FIG. 1 and the following description illustrate only sodium hydroxide as a typical example of a sodium salt produced by reductive decomposition of nitric acid and of a sodium salt to be recycled, the present invention includes cases in which the sodium salt is sodium hydrogencarbonate or sodium carbonate, or is a mixture of one or more of sodium hydroxide, sodium hydrogencarbonate and sodium carbonate.

The wet reprocessing process of a spent nuclear fuel is not limited to Purex process as long as the wet reprocessing process is a reprocessing process including a dissolution step for dissolving a spent nuclear fuel in nitric acid, reprocessing techniques represented by RETF, advanced wet reprocessing processes, and advanced wet processes adopting direct extraction, which have been introduced as prior art, and the like can be also employed.

Nitric acid generated in a separation or distribution process of uranium or plutonium and nitric acid in a washing solution produced in the purification process in the wet reprocessing process is mostly recovered by a nitric acid recovery system such as evaporative concentration and reused in the wet reprocessing process, while some of the nitric acid results in excess nitric acid.

This excess nitric acid is neutralized with sodium hydroxide, thereby producing a sodium nitrate liquid waste. For the neutralization reaction of the nitric acid, the nitric acid may be reacted with equimolar sodium hydroxide.

Further, in the wet reprocessing process, an off-gas having nitric acid dissolved therein is produced in the dissolution step for dissolving the spent nuclear fuel in the nitric acid. The off-gas includes nitrogen oxides, a slight amount of radioactive components, and the like, and is thus washed in contact with an alkali solution with the use of a scrubber or the like in order to remove the nitrogen oxides, the radioactive component, and the like. The washing liquid waste produced in this case also includes sodium nitrate, and thus, in the present invention, this washing liquid waste is also referred to as a sodium nitrate liquid waste produced in the neutralization step with sodium hydroxide.

The sodium nitrate liquid waste is then subjected to evaporative concentration to give a concentrated sodium nitrate liquid waste. The solubility of sodium nitrate in water is 91.9 g at 25° C. and 175.5 g at 100° C. with respect to 100 g of water, and a substantial amount of sodium nitrate is thus stably dissolved in the solution. Further, the melting point of sodium nitrate is 306.8° C., and sodium nitrate is decomposed at 380° C. Thus, when the sodium nitrate liquid waste is heated to approximately 100° C., water in the liquid waste is evaporated while the sodium nitrate is not moved into the water vapor but present stably in the liquid waste. Therefore, only water can be evaporated to concentrate the sodium nitrate liquid waste by heating the sodium nitrate liquid waste with an evaporator that has heating capacity to around 100° C. The water vapor generated in this case is condensed into a condensate liquid and discharged to the outside of the system.

Since the concentrated sodium nitrate liquid waste thus obtained is a low-level radioactive waste, it is conventionally subjected to vitrification, cement solidification or bituminization, or kept liquid, powdered, or pelletized for intermediate storage.

On the other hand, the present invention differs from prior art in that the concentrated sodium nitrate liquid waste is subjected to reductive decomposition processing with a reducing agent, and this reductive decomposition processing can achieve an advantageous effect unique to the present invention, that is, allowing for substantial decrease of waste generation due to the sodium nitrate liquid waste.

As the reductive decomposition processing of the concentrated sodium nitrate liquid waste, a catalytic reduction method and a supercritical reduction method can be used which have been introduced as prior art. In each method, sodium nitrate in the sodium nitrate liquid waste is reductively decomposed to convert nitrate ions into nitrogen gas and sodium ions into sodium hydroxide and also to generate water. In addition, carbon dioxide gas is generated from the reducing agent used for the reductive decomposition.

When the sodium nitrate is reductively decomposed by the catalytic reduction method, sponge copper catalysts, palladium catalysts, Raney nickel catalysts and ruthenium catalysts, and the like can be used as the catalyst, and hydrazine or a salt of hydrazine and the like can be used as the reducing agent. Alternatively, when the supercritical reduction method is employed, formic acid and the like can be used as the reducing agent.

Among the products, the gas components of the nitrogen gas and carbon dioxide gas are released into the air, while the sodium hydroxide and water present in the fluid is reused as sodium hydroxide to be used for neutralization of the excess nitric acid.

In addition, it is often the case that liquid wastes produced in the analyses carried out in each step of the wet reprocessing process are also nitrates, and if these liquid wastes are acidic, the wastes are subjected to neutralization processing with sodium hydroxide. Further, in the wet reprocessing process, an off-gas having nitric acid dissolved therein which is produced in the dissolution step for dissolving the spent nuclear fuel in the nitric acid includes nitrogen oxides, a slight amount of radioactive component, and the like. Thus, the off-gas is washed in contact with an alkali solution with the use of a scrubber or the like, in order to remove the nitrogen oxides, the radioactive component, and the like.

Therefore, the sodium hydroxide or water produced by reductive decomposition of the sodium nitrate may be also, if necessary, recycled into the wet reprocessing process to be reused as sodium hydroxide for neutralization of liquid wastes produced in analyses in each step of the wet reprocessing process or as an alkali solution for washing an off-gas.

It is to be noted that in the example described above, the sodium nitrate liquid waste produced in the neutralization step is concentrated by evaporation to give a concentrated sodium nitrate liquid waste, and the concentrated sodium nitrate liquid waste is then subjected to nitric acid reductive decomposition processing; however, the sodium nitrate liquid waste produced in the neutralization step can also be directly subjected to nitric acid reductive decomposition processing without concentration by evaporation, as indicated by an alternate long and short dash line in FIG. 1.

On the other hand, since an organic solvent used as an extracting solvent in an extraction step of the wet reprocessing process is degraded under a radiation environment, the degraded component needs to be removed prior to reuse. In order to remove the degraded component, the used organic solvent is washed with sodium hydroxide, and the washing waste liquid is neutralized with nitric acid, thereby producing a sodium nitrate liquid waste. This sodium nitrate liquid waste is also subjected to concentration by evaporation in the same way as the excess nitric acid, and the obtained concentrated sodium nitrate liquid waste is reductively decomposed with a reducing agent. Among the decomposition products, the gas components of the nitrogen gas and carbon dioxide gas are released into the air, while the sodium hydroxide and water present in the fluid are reused for washing the used organic solvent. Further, if necessary, the sodium hydroxide and water are also recycled into the wet reprocessing process to be reused as sodium hydroxide for neutralization of liquid wastes produced in analyses in each step of the wet reprocessing process or as an alkali solution for washing of an off-gas.

It is to be noted that also in the example described above, the used organic solvent is washed with sodium hydroxide, the sodium nitrate liquid waste produced by neutralizing the washing liquid waste with nitric acid is concentrated by evaporation to give a concentrated sodium nitrate liquid waste, and the concentrated sodium nitrate liquid waste is then subjected to nitric acid reductive decomposition processing; however, the sodium nitrate liquid waste produced by neutralizing the washing liquid waste from the organic solvent can also be directly subjected to nitric acid reductive decomposition processing without concentration by evaporation, as indicated by an alternate long and short dash line in FIG. 1.

When sodium hydroxide, which is produced by reductive decomposition of the sodium nitrate liquid waste or the concentrated sodium nitrate liquid waste and recovered, is reused, radioactivity due to FP is accumulated in the sodium hydroxide with the increasing number of recycles. In that case, a part of sodium hydroxide to be recycled is brought and subjected together with other radioactive wastes to vitrification, cement solidification, bituminization, or the like for solidification, thereby allowing accumulation of radioactivity in the recycled sodium hydroxide to be reduced.

In particular, when a part of the sodium hydroxide to be recycled is brought and mixed in a vitrified waste, the sodium hydroxide can be used as $Na_2O$ in borosilicate glass components, thus allowing the corresponding amount of new sodium hydroxide to be used in the neutralization step and allowing waste due to the sodium nitrate liquid waste to be cleared.

EXAMPLE

A sodium nitrate solution simulating a sodium nitrate liquid waste or a concentrated sodium nitrate liquid waste is charged into a supercritical reactor, formic acid (HCOOH) is added as a reducing agent to the sodium nitrate solution, and the temperature and pressure in the reactor are then adjusted to 400° C. and 30 MPa. The conditions exceed the critical point (374° C., 22 MPa) of water, resulting in the water in a supercritical state. After keeping this state for 30 minutes, the reactor is cooled rapidly to quench the reduction reaction.

The reductive decomposition products in this case include 95% of nitrogen, 4% of nitrate ions, and 1% of nitrite ions by the ratio of nitrogen, showing that most of nitrate ions in the sodium nitrate are decomposed. This reduction reaction is expressed by the following formula:

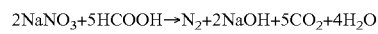

$$2NaNO_3 + 5HCOOH \rightarrow N_2 + 2NaOH + 5CO_2 + 4H_2O$$

This chemical reaction formula indicates the mass balance in the recycling system for the sodium salt obtained by the reductive decomposition of sodium nitrate, as stated below. More specifically, in theory, 2.0 of sodium nitrate and 1.0 of formic acid are converted to produce 1.0 of nitrogen gas, 4.0 of water, 5.0 of carbon dioxide gas and 2.0 of sodium hydroxide on a molar ratio basis.

Among the products, the sodium hydroxide and water are recycled for a neutralization step of excess nitric acid generated from the wet reprocessing process, while the gas components of the nitrogen gas and carbon dioxide gas are released into the air.

In addition, the recycling of the sodium hydroxide accumulates radioactivity in the sodium hydroxide. Thus, in order to reduce the accumulation of radioactivity, a part of the sodium hydroxide to be recycled is brought and charged into a vitrified high-level radioactive liquid waste. The following example shows borosilicate glass components of a vitrified waste at the reprocessing facility.

$SiO_2$: 43 to 47 wt %
$B_2O_3$: 14 wt %
$Al_2O_3$: 3.5 to 5 wt %
$Na_2O$: 10 wt %
Other glass components: 9 to 12.5 wt %
Waste oxides (excluding $Na_2O$): 15 wt %

As about 10 wt % of $Na_2O$ included in the borosilicate glass components as described above, the sodium hydroxide to be recycled can be mixed in a vitrified waste at a constant ratio, and the corresponding amount of new sodium hydroxide can be thus used in the neutralization step. As a result, a recycling process can be provided which is capable of clearing waste generation due to the sodium nitrate liquid waste.

The invention claimed is:

1. A process of recycling sodium salt in a wet reprocessing process of a spent nuclear fuel, comprising:
   a neutralization step in which a nitric acid liquid waste or an off-gas having nitric acid dissolved therein which is produced through a wet reprocessing process comprising a dissolution step for dissolving a spent nuclear fuel in nitric acid is neutralized by adding or contacting one or more sodium salts selected from the group consisting of sodium hydroxide, sodium hydrogencarbonate and sodium carbonate to or with the nitric acid liquid waste or the off-gas, thereby yielding a sodium nitrate liquid waste;
   a sodium nitrate-decomposition step in which the sodium nitrate liquid waste obtained in the neutralization step is reductively decomposed with a reducing agent, thereby decomposing sodium nitrate into a nitrogen gas and the sodium salt(s); and
   a recycle step for recycling the sodium salt(s) produced in the sodium nitrate-decomposition step into the neutralization step or the wet reprocessing process,
   wherein the reductive decomposition in the sodium nitrate-decomposition step is carried out by reductive decomposition using a reducing agent and a catalyst or by reductive decomposition using a reducing agent under supercritical conditions where water serves as a supercritical fluid.

2. The process according to claim 1, further comprising an evaporative concentration step in which the sodium nitrate liquid waste obtained in the neutralization step is concentrated by evaporation, and the concentrated sodium nitrate liquid waste obtained in the evaporative concentration step is reductively decomposed in the sodium nitrate-decomposition step.

3. The process according to claim 1, wherein a part of the sodium salt(s) to be recycled in the recycle step is brought and mixed in a solidified substance of a radioactive waste for solidification.

4. The process according to claim 1, wherein a part of the sodium salt(s) to be recycled in the recycle step is brought and mixed in a vitrified waste of a high-level radioactive waste for use as a part of a glass raw material.

5. A process of recycling sodium salt in a wet reprocessing process of a spent nuclear fuel, comprising:
   an organic solvent washing step in which an organic solvent used in a wet reprocessing process of a spent nuclear fuel is washed with one or more sodium salts selected from the group consisting of sodium hydroxide, sodium hydrogencarbonate and sodium carbonate;
   a neutralization step in which a liquid waste of the sodium salt(s) produced in the organic solvent washing step is neutralized with nitric acid, thereby yielding a sodium nitrate liquid waste;
   a sodium nitrate-decomposition step in which the sodium nitrate liquid waste produced in the neutralization step is reductively decomposed with a reducing agent, thereby decomposing sodium nitrate into a nitrogen gas and the sodium salt(s); and
   a recycle step for recycling the sodium salt(s) produced in the sodium nitrate-decomposition step into the organic solvent washing step or the wet reprocessing process,
   wherein the reductive decomposition in the sodium nitrate-decomposition step is carried out by reductive decomposition using a reducing agent and a catalyst or by reductive decomposition using a reducing agent under supercritical conditions where water serves as a supercritical fluid.

6. The process according to claim 5, further comprising an evaporative concentration step in which the sodium nitrate liquid waste obtained in the neutralization step is concentrated by evaporation, and the concentrated sodium nitrate liquid waste obtained in the evaporative concentration step is reductively decomposed in the sodium nitrate-decomposition step.

7. The process according to claim 5, wherein a part of the sodium salt(s) to be recycled in the recycle step is brought and mixed in a solidified substance of a radioactive waste for solidification.

8. The process according to claim 5, wherein a part of the sodium salt(s) to be recycled in the recycle step is brought and mixed in a vitrified waste of a high-level radioactive waste for use as a part of a glass raw material.

9. The process according to any one of claims 1 to 6, wherein a part of the sodium salt(s) to be recycled in the recycle step is brought and mixed in a solidified substance of a radioactive waste for solidification.

10. The process according to any one of claims 1 to 6, wherein a part of the sodium salt(s) to be recycled in the recycle step is brought and mixed in a vitrified waste of a high-level radioactive waste for use as a part of a glass raw material.

* * * * *